Dec. 24, 1968    D. CANE    3,418,214

INTEGRAL MAKE-UP DEAERATOR FOR FLASH EVAPORATOR

Filed Feb. 16, 1967

WITNESSES
E. Strickland
Wm. B. Sellers

INVENTOR
Domenick Cane
BY
Frank Citano Jr.

3,418,214
INTEGRAL MAKE-UP DEAERATOR FOR FLASH EVAPORATOR

Domenick Cane, Springfield, Pa., assignor to Westinghouse Electric Corporation, Pittsburgh, Pa., a corporation of Pennsylvania
Filed Feb. 16, 1967, Ser. No. 616,564
4 Claims. (Cl. 202—176)

ABSTRACT OF THE DISCLOSURE

A compact deaerator apparatus for removing air, carbon dioxide and other non-condensible gases from a make-up liquid directed to a flash evaporator for flash evaporation. The deaerator apparatus is formed integrally with and disposed within the flash evaporator and comprises generally a heating section and a gas stripping or deaerating section. Vapor is generated in the flash chamber, the greater portion of which is directed into a condensing space where it is condensed to form a substantially pure product liquid. A lesser portion of the generated vapor is directed through the stripping section to strip the incoming, preheated make-up liquid of non-condensible gases. The stripped gases and steam are then routed to the heating section to which the make-up liquid is first directed. The steam preheats the make-up liquid to saturation temperature which causes the release of a major portion of the non-condensible gases contained in the liquid before the liquid is directed into the stripping section for the srtipping action. From the stripping section, the substantially deaerated make-up liquid joins the body of recirculating liquid for flash evaporation. The air and other non-condensible gases are vented from the heating section.

---

Figure 1:
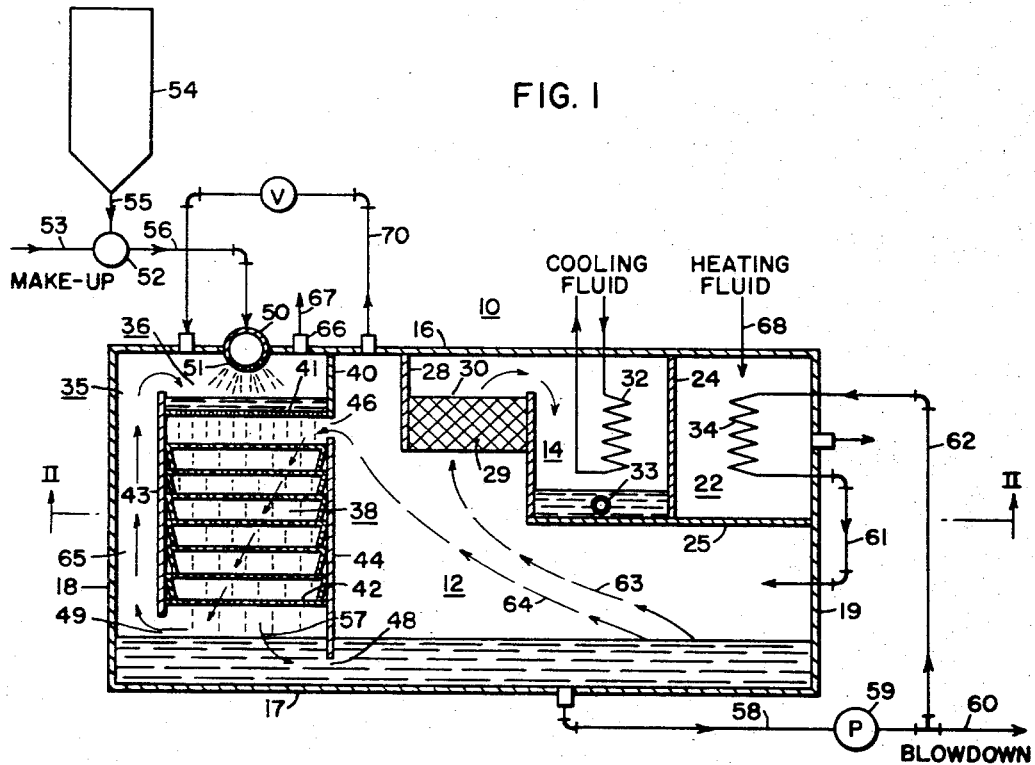

The present invention relates generally to flash evaporators and particularly to a novel deaerator structure for flash evaporators employing acid treatment apparatus.

It is generally known that untreated seawater which is heated and concentrated by modern recirculation-type distillation plants forms precipitates that deposit as scale on heat transfer surfaces of flash evaporator apparatus. These scale deposits act as thermal insulators and reduce the efficiency of the evaporation process. Improvements in treatment to prevent scale formation have made it possible, however, to operate over long periods of time without such formation.

The three principal types of seawater evaporator scale deposits are calcium carbonate ($CaCO_3$), magnesium hydroxide ($MgOH_2$), and calcium sulfate ($CaSO_4$). The formation of these scale deposits is influenced by: (1) maximum brine temperature, (2) concentration of recycle brine, and (3) hydrogen-ion concentration (pH). While pH strongly effects calcium carbonate and magnesium hydroxide, it probably has little effect on the formation of calcium sulfate scale. The latter can be prevented by not exceeding its solubility. This requires that the maximum concentration in the recycle brine be limited. All of the scale-forming compounds have inverted solubility curves, so that as temperature increases, the compounds become less soluble.

Thus far, the scale-control technique that usually has proved most successful in flash-evaporator plants is pH control. Since carbonates and hydroxides are made more soluble by lowering pH, acid is fed to the make-up seawater to maintain a pH normally ranging from 7.0 to 7.5, thereby preventing scale compounds from depositing.

Prior to the use of acid treatment for scale control, the make-up seawater was introduced into the flash evaporator system via the recycle conduit and directed with the recycled brine to the flash chamber of the evaporator where direct heating of the make-up occurred. A subsequent deaeration of the make-up then occurred in the flash chamber or chambers of the evaporator. As known in the art, deaeration of the incoming seawater is required to remove the dissolved air from the seawater and thereby reduce the corrosive tendency of the seawater, and to prevent the dissolved air and other non-condensible gases from increasing the pressure within the stage or stages of the flash evaporator since the evaporator stages are maintained at reduced atmospheres for the effective flash evaporation of the water and recycled brine.

With the development and increasing use of acid treating processes, deaeration has become more of a problem because of the substantial quantities of carbon dioxide formed as a result of a chemical reaction of the acid with the seawater. Deaeration of the treated seawater has generally been accomplished by use of a large deaerating vessel physically separated from the flash evaporator. The treated make-up seawater is directed to the vessel to effect removal of the non-condensible gases, oxygen and free carbon dioxide, and is then directed to the flash evaporator for flash evaporation, thereby substantially reducing the possibility of corrosion and pressure changes within the evaporation stage or stages.

The use of physically separated deaerator vessels has added cost factors in an art (water desalination) where cost reduction is a primary concern, since a great need exists for potable water, but the economics involved do not always justify the cost. The deaerator vessels add costs due to the fact that they must, first of all, be manufactured, and they are preferably manufactured from expensive corrosion resistant materials such as stainless steel. Secondly, foundation structures must be built to support the vessels that are becoming larger with the increasing capacity of the flash evaporation units. Thirdly, the plumbing necessary for connecting the deaerator vessel with the flash evaporator is, of course, another expense item adding to the overall cost of the flash evaporator. Furthermore, connecting pipes produce pressure drops which reduce further the effectiveness of the flash evaporator system.

In accordance with the broad principles of the present invention, deaerating apparatus is incorporated inside a flash chamber of a flash evaporator in such a manner that a cost saving, compact, integral unit is formed that effectively deaerates the make-up water before it is flash evaporated.

Treated but unheated make-up water is sprayed into a heating section of the deaerating apparatus where the water spray is contacted by steam originating in the flash chamber. The steam preheats the water to saturation temperatures which causes the major portion of the air and other non-condensible gases retained in the water to be removed therefrom for venting to atmosphere.

The preheated water is then admitted to a gas stripping section of the deaerator apparatus from the heating section. The stripping section includes apparatus, such as a stack of perforated trays, which allows the water to fall therethrough in the form of rain or sheets. Steam en route to the heating section is first directed to the stripping section and through the trays so that it mixes with the sheets of water to strip the water of any remaining non-condensible gases with minimal heating of the water. The remaining gases and steam are then directed to the heating section where the gases are vented or ejected to a region of lower pressure, and the steam performs its preheating function.

The steam is condensed in the resulting heat exchange with the make-up water in the heating section, and the thus formed condensate falls jointly with the heated make-up water through the stripping section to join the stream of recycle brine flowing in the lower portion of the flash chamber.

As can be readily seen, the deaerating apparatus, briefly described above, needs no housing structure other than that of the flash evaporator itself; no piping is needed to place the apparatus in fluid communication with the flash evaporator, and no separate foundation or support structure is required.

It is, therefore, an object of the invention to provide an economical deaeration apparatus for a flash evaporator that is effective in substantially reducing the amount of corrosion in the flash evaporator by substantially reducing the amount of dissolved gases in the liquids in the flash evaporator.

Another object of the invention is to provide a flash evaporator with a compact integral deaeration apparatus.

A further object of the invention is to provide a compact deaeration apparatus that is effective in improving the rate of heat transfer in the condenser section of a flash evaporator.

Yet another object of the invention is to provide a deaeration apparatus that substantially reduces corrosion in flash evaporators due to the evolution of gases in the flash chambers of the flash evaporators by effectively deaerating the make-up liquid before it enters the flash chambers.

Figure 2:
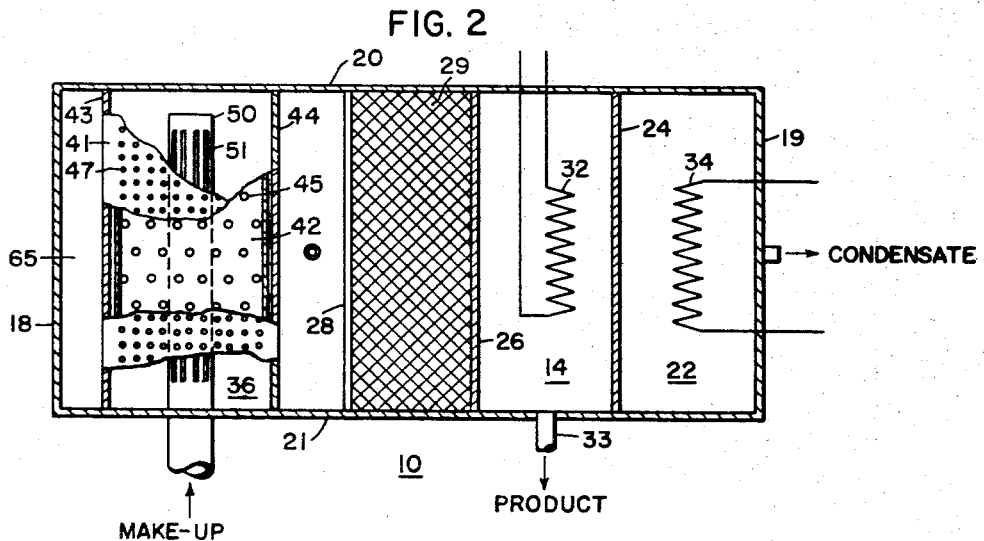

These and other objects and advantages of the invention will become more apparent from the following description taken in connection with the drawing, in which:

FIGURE 1 is a diagrammatic representation of a flash evaporator incorporating the invention; and FIG. 2 is a section of the flash evaporator of FIG. 1 taken along lines II—II with portions thereof broken away.

Specifically, there is shown in FIG. 1 a flash evaporator system generally designated 10. As illustrated, the evaporator is of the single stage type and the stage includes a flash chamber 12 and a steam condensing space 14 shown disposed above the chamber, the chamber and condensing space being maintained at a reduced pressure ambient. The flash evaporator stage of system 10 may be formed by a metal housing structure of parallelepiped shape having a top wall 16, a bottom wall 17, vertical end side walls 18 and 19, and front and rear side walls (FIG. 2) 20 and 21, respectively.

The housing structure further defines an integral top heater 22 shown separated from the condenser space 14 by a vertical partition 24. The top heater and the condensing space are further defined by a horizontally extending wall portion 25 which separates them from the flash chamber 12.

The condensing space 14 is further separated from the flash chamber 12 by two horizontally spaced vertical wall portions 26 and 28, and a mesh separator or demister 29 is disposed between the vertical wall portions. The demister 29 covers an opening 30 which places the condensing space 14 in fluid communication with the flash chamber 12, the demister functioning to remove water droplets in the steam generated in the flash chamber as the vapor passes through the demister into the condensing space.

The condensing space 14 is provided with a suitable surface heat exchanging or condensing tube structure 32 for cooling and thereby condensing the steam entering the space 14 from the flash chamber 12. The thus formed condensate is collected in the bottom of the space 14 and is directed therefrom as the product water by a suitable conduit 33 as best seen in FIG. 2.

The top heater 22 is provided with a suitable surface heat exchanging or heating tube structure 34 arranged to pre-heat the recirculating brine in a manner to be explained hereinafter.

In accordance with the invention, the flash evaporator housing structure of the system 10 further defines a housing structure for an integral deaerator apparatus generally designated 35. The apparatus includes, generally, a heating section 36 and a gas stripping or deaerating section 38. The heating section is defined by a vertical wall 40 depending from and connected to the upper wall 16, and an orifice seal plate 41 both of which extend from the front to the rear walls 20 and 21, respectively, of the evaporator housing structure as best seen in FIG. 2, the vertical wall 40 and seal plate 41 are thus effective to physically separate the heating section 36 from the flash chamber 12 and the gas stripping section 38.

The gas stripping section 38 is disposed directly beneath the seal plate 41, and comprises a stack of trays 42 provided with perforations 45 and supported between two vertical wall structures 43 and 44. The wall structures and trays extend laterally between the front and back walls 20 and 21, respectively, of the evaporator housing as best seen in FIG. 2. The upper end of the wall 44 is spaced from the wall 40 to form an opening 46 which places the stripping section in fluid communication with the flash chamber 12. Similarly, the lower portion of the wall 44 extends to a point above the bottom wall 17 of the housing to form an opening 48 which places the stripping section in liquid communication with the flash chamber 12. The lower portion of the wall 44 does, however, extend into the body of unflashed water in the lower portion of the stage to form a liquid seal therewith.

The perforations 45 in the trays 42 are designed and arranged in such a manner that ample surface and dwell time are provided for the water passing through the stripping section 38 so that the water can be thoroughly contacted and mixed with steam for reasons to be explained hereinafter.

The heating section 36 is placed in liquid communication with the stripping section 38 through a plurality of small diameter holes 47 provided in the seal plate 41, and in fluid communication with the stripping section by way of an opening 49 provided at the lower end of the vertical wall 43. The small diameter holes 47 are dimensioned and arranged to limit the flow of water therethrough so that a reservoir of water is contained above the seal plate in a receptable formed by the deaerator walls 40 and 43, the front and rear walls 20 and 21 of the evaporator housing structure, and the seal plate 41 itself. The reservoir of water provides a liquid seal between the heating section 36 and the stripping section 38 for purposes to be explained hereinafter.

Disposed at the top of the heating section 36, and extending substantially the width of the evaporator, is a pipe 50 provided with elongated slots 51 in the portion of pipe wall facing the seal plate 41. The pipe 50, as illustrated in FIG. 1, is disposed in and suitably sealed to the top wall 16 of the housing structure. The slotted portion of the pipe is dimensioned and disposed in such a manner that the water to be evaporated is sprayed into the deaerator 35 or otherwise admitted thereto to promote the deaeration of the water.

In operation, seawater, brackish water or other impure water from a suitable source, such as a river, lake or sea, is directed to a mixing and metering device 52 as indicated by line 53. In the mixing device, the impure water, usually termed "make-up" water, is treated with a suitable chemical additive, such as sulfuric acid, for example.

The additive is contained in a vessel 54 and supplied to the mixing device 52 via line 55.

The treated make-up water is then directed to the flash evaporator system 10, as indicated by line 56, and sprayed or otherwise admitted into the deaerator 35 by the pipe 50 in a manner to promote deaeration of the water. The spray falls to the seal plate 41, collects over the plate and in the reservoir structure described above. The water collects because the small diameter holes 47, provided in the plate, limit the amount of water flow therethrough.

From the plate 41, the water descends through the stack of perforated trays 42 in a cascading rain of water. From the last tray in the stack, the water joins the body of unflashed water circulating in the lower portion of the evaporator housing, as indicated by arrow 57, from whence it flows into the flash chamber 12 through the opening 48.

The impure water is then directed from the flash chamber 12 through line 58 by a suitable pump 59, and is recirculated to the flash chamber through the top heater 22 via the lines 61 and 62 respectively. The top heater 22 preheats the water, before it is directed to the flash chamber for flash evaporation, by a suitable heating fluid directed around the heating tube structure 34 as indicated by line 68.

The preheated water enters the flash chamber 12, from line 61, and joins the body of unflashed water circulating therein; a portion thereof is flashed into steam because of the reduced pressure ambient maintained in the flash evaporator. The major portion of the flashed steam is directed upwardly into the condensing space 14 through the demister 29, as indicated by the dashed arrows 63. The steam is condensed by the heat transfer from the condensing tube structure 32 which conducts a suitable fluid coolant therethrough, such as unheated seawater, for example.

As well known in the art, flash evaporation of the impure water causes it to become enriched with salts and other minerals and it is generally termed enriched brine.

A portion of brine is "blown down" via a blow-down line or conduit 60 connected to the pump 59. As well known in the art, the blow-down line is employed to remove from the system 10 a portion of the enriched brine so that the water that circulates through the system will not exceed a predetermined level of salinity. The remaining portion of the brine is recirculated in the system 10 with the impure water, as indicated by line 62.

The corrosive, non-condensible gases contained in the impure make-up water directed to the flash evaporator are removed therefrom by a portion of the steam originating in the flash chamber 12. The steam rises from the body of water and brine, and is directed into the gas stripping section 38 through the opening 46 as indicated by dashed arrows 64. The steam is prevented from entering directly into the heating section 36 by the wall portions 40 and 43 and the reservoir of water on the plate 41 which forms the above-mentioned liquid seal. The steam is further directed downwardly through the perforated trays 42 and then directed to the heating section 36 through the opening 49 and a vertical passageway 65 formed by the vertical wall 43 and the end wall 18 of the evaporator housing.

In the heating section, the steam preheats the unheated make-up water, which is sprayed therein by the pipe 50, to saturation temperature before it enters the stripping section 38. A substantial portion of the air and non-condensible gases contained in the make-up water are liberated therefrom by the spraying and heating actions, and vented or pumped to atmosphere or another region or regions of lower pressure via a suitable vent 66, as indicated by arrow 67.

In the stripping section 38, the preheated make-up water descends through the perforations 45 in the trays 42 in the form of rain so that the steam, as it flows downwardly, has ample opportunity to contact and mix with the descending water. The steam performs essentially a gas stripping function on the water that removes the remaining portion of non-condensible gases from the water before it joins the main recycle stream in the lower portion of the flash evaporator, as indicated by the arrow 57. The non-condensible gases are routed to the heating section 36 through the opening 49 and passageway 65 where they are vented to reduced atmosphere with the gases removed in the heating section.

A steam bypass conduit 70 may be provided (FIG. 1) to divert excess steam (beyond that required for the stripping function in the deaerator section 38) to the heating section 36.

It should now be apparent from the foregoing description that a novel, compact deaerating apparatus 35 for a flash evaporating system has been disclosed. The apparatus is disposed in and forms an integral part of a flash evaporation stage so that no costly plumbing is necessary to place the apparatus in fluid communication with the flash evaporator. Further, the costs of a separate housing structure and supporting foundation are eliminated by using the housing and foundation structures of the flash evaporator.

Though the invention has been described with a certain degree of particularity, it is to be understood that other variations and embodiments are possible within the scope and spirit of the invention. For example, the invention has been described in connection with a single stage evaporator. The invention may, however, be employed in a multistage evaporation apparatus, for example, in the last and lowest pressure stage thereof.

What is claimed is:

1. A flash evaporator system for extracting a substantially pure product liquid from an impure liquid comprising wall structure defining a housing having at least one evaporation stage including a flash chamber maintained at a reduced pressure ambient for flash evaporating at least a portion of the impure liquid, means defining a vapor condensing space, means for directing a portion of the vapor from said evaporation stage to said condensing space, deaerating apparatus disposed within the housing for removing air and other non-condensible gases from the impure liquid, said apparatus having first and second sections, means for admitting the impure liquid into the first section in finely divided form, liquid seal means for admitting the impure liquid to said section, upwardly extending wall structures defining said second section with the liquid seal means, said second section disposed below said first section, perforated trays substantially horizontally disposed within said upwardly extending wall structures for causing the admitted impure liquid to fall towards the lower portion of said second section in finely divided form, means for directing vapor in said second section to said first section, said means including an outlet opening adjacent the lower portion of said second section, and said second section being provided with an inlet opening adjacent the upper portion thereof for admitting vapor thereto from the flash chamber so that the admitted vapor is directed downwardly through the trays in essentially the same direction as the falling finely divided impure liquid.

2. The system recited in claim 1 in which the liquid seal means includes a plate structure provided with a plurality of small holes arranged and dimensioned to control the amount of liquid flow therethrough.

3. The system recited in claim 1 in which the liquid seal means includes a plate structure which cooperates with a portion of the wall structures defining the evaporation stage housing and said first and second sections to form a reservoir structure above said second section.

4. The system recited in claim 1 including a conduit structure for diverting a portion of the vapor from the flash chamber directly to the first section.

References Cited

UNITED STATES PATENTS

| | | | |
|---|---|---|---|
| 1,734,515 | 11/1929 | Elliott | 55—42 |
| 1,966,791 | 7/1934 | Fowler et al. | 55—54 X |
| 2,663,286 | 12/1953 | Worn | 55—39 X |
| 2,689,018 | 9/1954 | Kittredge et al. | 55—39 X |
| 3,194,747 | 7/1965 | Ris et al. | 202—176 X |

REUBEN FRIEDMAN, *Primary Examiner.*

R. W. BURKS, *Assistant Examiner.*

U.S. Cl. X.R.

202—173, 197; 203—100; 55—39, 198; 261—113, 141